(12) United States Patent
Paul et al.

(10) Patent No.: US 6,944,010 B1
(45) Date of Patent: Sep. 13, 2005

(54) CHARGE STORAGE DEVICE (75) Inventors: George Lange Paul, Chatswood West (AU); Rory Albert James Pynenburg, Hillsboro, OR (US); Peter John Mahon, Narrabundah (AU); Sarkis Keshishian, Ermington (AU)

(73) Assignee: Energy Storage Systems PTY Ltd., Lane Cove (AU)

( * ) Notice: Subject to any disclaimer, the term of this patent is extended or adjusted under 35 U.S.C. 154(b) by 197 days.

(21) Appl. No.: 10/019,393

(22) PCT Filed: Aug. 30, 2000

(86) PCT No.: PCT/AU00/01029

§ 371 (c)(1),
(2), (4) Date: Jun. 3, 2002

(87) PCT Pub. No.: WO01/16971

PCT Pub. Date: Mar. 8, 2001

(30) Foreign Application Priority Data

Aug. 30, 1999 (AU) .............................. PQ2530

(51) Int. Cl.[7] .............................. H01G 9/00; H01G 9/04
(52) U.S. Cl. ........................ 361/502; 361/503; 361/528
(58) Field of Search ............................... 361/502–520, 361/525–538

(56) References Cited

U.S. PATENT DOCUMENTS

| | | | | |
|---|---|---|---|---|
| 4,037,032 A | * | 7/1977 | Nidola et al. ................ | 429/199 |
| 4,218,519 A | | 8/1980 | Frank ........................... | 429/15 |
| 4,604,333 A | | 8/1986 | Ikeda et al. .................... | 429/94 |
| 4,628,011 A | | 12/1986 | Feldman et al. .............. | 429/49 |
| 4,948,685 A | | 8/1990 | Ohsawa et al. ............. | 429/213 |
| 5,219,676 A | * | 6/1993 | Bullock et al. ................ | 429/48 |
| 5,445,856 A | | 8/1995 | Chaloner-Gill ............ | 428/35.9 |
| 5,450,279 A | | 9/1995 | Yoshida et al. ............. | 361/502 |
| 5,601,946 A | | 2/1997 | Hattori et al. .............. | 429/206 |
| 5,779,891 A | * | 7/1998 | Andelman ............... | 210/198.2 |
| 5,926,362 A | | 7/1999 | Muffoletto et al. ......... | 361/503 |

FOREIGN PATENT DOCUMENTS

| | | | |
|---|---|---|---|
| EP | 0 224 932 | 6/1987 | |
| EP | 0 386 305 | 9/1990 | |
| EP | 0 854 529 | 7/1998 | |
| GB | 2 046 019 | 11/1980 | |
| JP | 52-116837 | * 9/1977 | ............ H01M/2/32 |

OTHER PUBLICATIONS

Derwent Abstract Accession No. 90–003392/01, JP 01–286262 A (Nippon Teleg & Teleph) Nov. 17, 1989.
Derwent Abstract Accession No. 86–276709/42, JP 61–203575 A (Hitachi KK) Sep. 9, 1986.

* cited by examiner

*Primary Examiner*—Eric W. Thomas
(74) *Attorney, Agent, or Firm*—Kenyon & Kenyon (57) ABSTRACT

A charge storage device (1) includes a sealed prismatic housing (2). Two opposed folded rectangular aluminium electrodes (3, 4) are disposed within housing (2) and connected to respective metal terminals (5, 6) for allowing external electrical connection to the electrodes. A porous, electronically insulating separator material, e.g. Solupor™, sheet separator (7) is disposed intermediate electrodes (3, 4) for maintaining those electrodes in a fixed spaced apart configuration. An electrolyte (not shown) is also disposed intermediate the electrodes. Collecting means in the form of a scavenging agent is grafted to separator (7) for sequestering one or more predetermined contaminants from the housing.

27 Claims, 7 Drawing Sheets

CHARGE STORAGE DEVICE

FIELD OF THE INVENTION

The present invention relates to a charge storage device.

The invention has been developed primarily for supercapacitors and will be described hereinafter with reference to that application. However, the invention is not limited to that particular field of use and is also suitable for other charge storage devices such as capacitors, batteries, fuel cells and the like.

DISCUSSION OF THE PRIOR ART

Supercapacitors in the form of electric double layer capacitors are known. These capacitors generally include a housing for two aluminium electrodes each of which have a coating of activated carbon or the like on at least one side. The electrodes are typically wound or otherwise interleaved together with an intermediate separator and wetted with an appropriate electrolyte. The charge is stored in the electric double layer which is formed between the carbon and the electrolyte. Due to the large surface area per volume of the activated carbon the charge storage density of these devices is high.

One limitation of these supercapacitors is that, due to the nature of the known electrolytes, the housing must be sealed to prevent both leakage of the electrolyte—comprising of salt and solvents—from the housing and ingress of contaminants into the housing. A failure to sufficiently guard against the latter causes a degradation of the capacitor performance by reducing the maximum achievable operating voltage, increasing the leakage current, increasing the resistance and decreasing the available capacitance. If the ingress is allowed to persist it will ultimately render the capacitor unworkable.

Batteries are also known and also use electrolytes, although, in distinction to supercapacitors, the energy is stored electrochemically. In any event, batteries also require the secure storage of the electrolyte within a housing to prevent its escape to the environment and to maintain its purity.

As a partial solution to ensuring that the electrolyte is maintained within the housing and free of contamination, much effort has been expanded in providing the housing with walls that offer good barrier properties to the passage of fluids. An example of such an arrangement for a battery is disclosed in U.S. Pat. No. 5,445,856. This battery housing includes a wall made from a laminate having an oxygen scavenging agent either:

1. Incorporated in one of the layers of the laminate; or
2. Disposed between any two of the layers.

This feature is intended to increase the barrier properties of the housing to the ingress of contaminants through the laminate. While oxygen is the primary concern it is preferred that the agent also inhibits the transport of water through the laminate.

Notwithstanding the additional complexity, cost and improved barrier properties of this prior art housing, these types of charge storage devices are still very much subject to electrolyte contamination and degradation. Accordingly, over time, the performance of the device progressively deteriorates and the operation lifetime of the devices is compromised.

DISCLOSURE OF THE INVENTION

It is an object of the present invention, at least in the preferred embodiment, to overcome or substantially ameliorate one or more of the disadvantages of the prior art, or at least to provide a useful alternative.

According to one aspect of the invention there is provided a charge storage device including:

a housing;

at least two opposed electrodes disposed within the housing;

a separator disposed intermediate the electrodes;

an electrolyte disposed intermediate the electrodes; and collecting means disposed within the housing for sequestering one or more predetermined contaminants from the housing.

Preferably, the electrodes each include a coating and the collecting means is one component of at least one of the coatings. More preferably, the coatings include an activated carbon and the collecting means is incorporated into the at least one coating prior to application to the electrodes. Even more preferably, the at least one coating includes a binder and the collecting means is contained within the binder.

Preferably also, the collecting means is activated to sequester the one or more contaminants. More preferably, the collecting means is included within the binder prior to that activation. Even more preferably, the collecting means is activated after assembly of the charge storage device. In still further preferred embodiments, the activation is achieved by applying a predetermined voltage across the electrodes. In other embodiments the activation is achieved by electrochemical means.

In other embodiments, however, the collecting means is activated prior to inclusion of the collecting means within the binder. Moreover, in further embodiments, the collecting means is activated either prior to or during the assembly of the charge storage device.

In some preferred embodiments the collecting means is activated by exposure to predetermined wavelengths and intensities of electromagnetic radiation such as ultraviolet radiation. In other embodiments, the collecting means is exposed to an electron beam.

In other embodiments, the collecting means is contained within the electrolyte.

Preferably also, the collecting means sequesters oxygen from the housing. More preferably, the collecting means is the compound marked as ZERO 2 as sold and marketed by Southcorp Packaging. In other embodiments, the collecting means sequesters water from the electrolyte. In still further embodiments the collecting means sequesters other substances such as bromine and chlorine.

In a preferred form the sequestering results in the contaminants being isolated from the charge storage operation of the device. In other embodiments the sequestering results in a chemical change of the contaminants.

Preferably, where the collecting means is a component of the electrolyte, the sequestering results in additional electrochemical activity. More preferably, this additional activity improves the overcharge performance of the device.

In some embodiments the collecting means is a scavenging species. More preferably, the collecting means is grafted or otherwise incorporated into the separator. As will be appreciated by those skilled in the art, locating the collecting means with the separator will allow optimum removal of contaminants from the electrolyte.

Preferably also, the housing includes an interior surface and an exterior surface, and the collecting means is disposed on the interior surface.

According to a second aspect of the invention there is provided a method for constructing a charge storage device having a housing, the method including the step of providing collecting means disposed within the housing for sequestering one or more predetermined contaminants from the housing.

Preferably, the device includes two spaced apart electrodes, a separator intermediate the electrodes and an electrolyte for wetting the electrodes, the electrodes, separator and electrolyte being disposed within the housing and the method including the further step of grafting the collecting means to the housing. In other embodiments the method includes the step of grafting the collecting means to the separator. In still further embodiments the collecting means is disposed within the electrolyte.

According to a third aspect of the invention there is provided a charge storage device including:

a housing;

at least two opposed electrodes disposed within the housing;

a separator disposed intermediate the electrodes;

an electrolyte disposed intermediate the electrodes; and collecting means for allowing removal of one or more predetermined contaminants from the housing.

Preferably, the collecting means includes a port in the housing through which the one or more contaminants are selectively drawn. More preferably, the device includes sealing means to prevent ingress of contaminants through the port and into the housing. Even more preferably, the sealing means is a one way valve. In other embodiments, however, the sealing means is a septum extending across the port.

In a preferred form the collecting means also sequesters the one or more predetermined contaminants. Even more preferable, the collecting means is activated to initialise the sequestering and subsequently reactivated to:

effect release of the sequestered contaminants into the housing; and then once again commence the sequestering of the one or more predetermined contaminants from the housing.

Preferably also, the collecting means includes a port in the housing which is selectively subjected to an external negative pressure to draw from the housing the contaminants released upon reactivation of the collecting means.

In other embodiments, a scavenging agent is progressed through the port and into the housing for sequestering the one or more predetermined contaminants. More preferably, the scavenging agent is removed from the housing via the port. Even more preferably, the scavenging agent is activated for sequestering the one or more contaminants prior to progression in to the housing. In other embodiments, however, the activation occurs once the scavenging agent is in the housing. More preferably, the activation is achieved by exposure of the scavenging agent to predetermined wavelengths of electromagnetic radiation. Even more preferably, the housing includes a window which is at least partially transparent to those predetermined wavelengths.

According to a fourth aspect of the invention there is provided a method for removing one or more predetermined contaminants from a charge storage device having a housing defining a cavity, the method including the steps of:

providing a port in the housing for allowing selective external fluidic communication with the cavity; and applying an external negative pressure to the port to draw the one or more contaminants from the cavity.

Preferably, the method includes the additional step of providing a positive pressure to the cavity for directing the one or more contaminants from the cavity and through the port. More preferably, the port is a one way valve. In other embodiments, however, the port is a self sealing septum and the method includes the additional steps of:

providing an insertion device having a through passage which extends between a first and a second end;

applying a negative pressure to the first end; and driving the second end through the septum to apply the negative pressure to the cavity such that the one or more contaminants are drawn into the through passage.

Preferably, the method includes the additional step of providing collecting means in the cavity for sequestering the one or more predetermined contaminants. Even more preferably, the method includes the step of activating the collecting means to initialise the sequestering. Even more preferably, the method includes the step of reactivating the collecting means to effect release of the sequestered contaminants into the housing and thereafter applying the negative pressure to the first end. More preferably, the reactivation also allows the collecting means to recommence the sequestering of the one or more predetermined contaminants from the housing.

According to a fifth aspect of the invention there is provided a charge storage device including:

a housing;

a first sheet electrode disposed within the housing;

a second sheet electrode disposed within the housing adjacent to and opposed with the first sheet electrode;

a separator for enveloping substantially all of the first electrode and for maintaining the electrodes in a spaced apart configuration;

an electrolyte disposed intermediate the electrodes; and two terminals extending from the respective electrodes and terminating outside the housing for allowing external electrical connection to the electrodes.

Preferably, the separator includes two opposed separator sheets which are connected along at least one common edge and the first electrode is disposed between the separator sheets. More preferably, the separator sheets are integrally formed. Even more preferably, the separator sheets are integrally formed along the common edge.

Preferably also, each separator sheet includes a first edge and a second edge spaced apart from the first, both of which extend away from the common edge. More preferably, each separator sheet also includes a third edge which extends between the first edge and the second edge, wherein the first edges are opposed and joined together and the second edges are opposed and joined together. Even more preferably, the third edges are opposed.

In a preferred form, the first electrode includes a first sub-sheet and a second sub-sheet which is opposed to the first. More preferably, the first and the second sub-sheets are opposed. Even more preferably, each of the first and second sub-sheets are joined along a common edge. Preferably also, the common edge between the first and second sub-sheets is disposed adjacent to the common edge between two opposed separator sheets.

According to another aspect of the invention there is provided a method of constructing a charge storage device having a housing, the method including the steps of:

disposing at least two opposed sheet electrodes within the housing;

enveloping substantially all of a first one of the electrodes with a separator for maintaining the electrodes in a spaced apart configuration;

disposing an electrolyte intermediate the electrodes; and providing two terminals extending from the respective electrodes and terminating outside the housing for allowing external electrical connection to the electrodes.

Preferably, the separator includes two opposed separator sheets connected along at least one common edge and the method includes the further step of disposing the first electrode between the separator sheets. More preferably, the separator sheets are integrally formed. Even more preferably, the separator sheets are integrally formed along the common edge.

Preferably also, each separator sheet includes a first edge and a second edge spaced apart from the first, both of which extend away from the common edge. More preferably, each separator sheet also includes a third edge which extends between the first edge and the second edge, wherein the method includes the further step of joining together the first edges and joining together the second edges. Even more preferably, the third edges are opposed.

BRIEF DESCRIPTION OF THE DRAWINGS

Preferred embodiments of the invention will now be described, by way of example only, with reference to the accompanying drawings, in which.

PREFERRED EMBODIMENTS OF THE INVENTION

Figure 1:
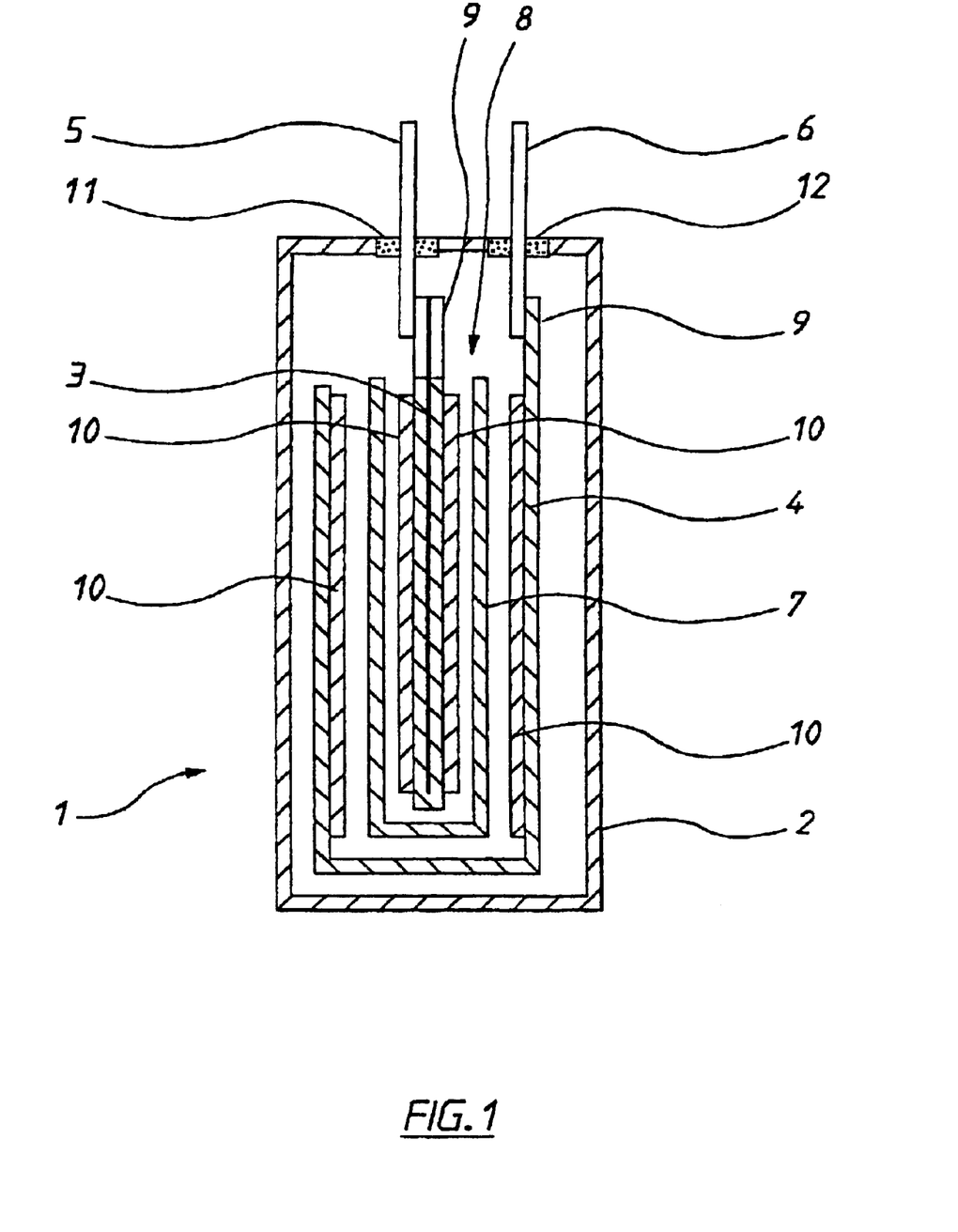
FIG. 1 is a schematic cross section of a supercapacitor according to the invention.

Referring to FIG. 1, a charge storage device 1 includes a sealed prismatic housing 2. Two opposed folded rectangular aluminium electrodes 3 and 4 are disposed within housing 2 and connected to respective metal terminals 5 and 6 for allowing external electrical connection to the electrodes. A Solupor™ sheet separator 7 is disposed intermediate electrodes 3 and 4 for maintaining those electrodes in a fixed spaced apart configuration. An electrolyte (not shown) is also disposed intermediate the electrodes. Collecting means in the form of a scavenging agent is grafted to separator 7 for sequestering one or more predetermined contaminants from the housing.

Separator 7 is formed in a "pocket" configuration, wherein it is folded back upon itself and the transverse ends secured together for providing an opening 8 between the transverse ends. For ease of illustration, separator 7 is shown as having two fold lines. In practice, however, a single fold line is used as the separator is abutted directly against the opposed electrodes. The porous nature of the separator allows the movement of ions in the electrolyte between the electrodes.

Each electrode is formed from a single like aluminium sheet having at least one tab 9 which is electrically engaged with the respective terminals 5 and 6. The electrodes are folded into the overlapping and nested configuration shown in the drawing. Again, it will be appreciated that for ease of illustration electrode 4 is shown with two fold lines. In practice, however, a single fold is made as this electrode is abutted directly against separator 7.

Electrode 3 is received within opening 8 and enveloped by separator 7 such that only tab 9 extends from the "pocket" or pouch. This electrode and separator combination is then inserted into the folded electrode 4 to complete a single capacitive cell. While in this embodiment only a single cell is illustrated, in other embodiments use is made of two or more such cells. The electrode area of the electrodes is about 102 cm$^2$ which provides a nominal capacitance of about 28 Farads at 2.5 Volts.

Each of electrodes 3 and 4 includes a high surface area coating 10 of activated carbon particles. This coating is of a predetermined thickness and includes a binder to facilitate intimate engagement between the carbon particles and the electrodes.

In this embodiment the scavenging agent is the compound marked as ZERO 2 as sold and marketed by Southcorp Packaging. About 25 mg of the compound is grafted to separator 7 during the manufacture of the supercapacitor. More particularly, one of the process steps of manufacture includes interleaving the separator with the electrodes. Immediately prior to this step, the grafting occurs, followed by activation of the scavenging agent by UV radiation of a predetermined wavelength and intensity. The separator with the activated scavenging agent is then interleaved with the electrodes in the controlled manufacturing environment. As would be understood by those skilled in the art, it is important to conduct supercapacitor and other energy storage manufacture is controlled conditions to minimise any contamination. Accordingly, notwithstanding that the scavenging agent has been activated and that it will almost immediately commence sequestering of contaminants, the location of the still partially constructed supercapacitor within the standard controlled environment minimises exposure to those contaminants.

As terminals 5 and 6 extend from the inside to the outside of housing 2 they are sealingly engaged intermediate their respective ends with the housing. In this embodiment the sealing engagement is effected by two rubber grommets 11 and 12. In other embodiments use is made of grommets constructed from other materials or combinations of materials. For example, some devices make use of silicon sealing compounds and adhesives.

In any event, the commercially available sealing means are not entirely effective and have a finite working lifespan as they progressively degrade over time. Accordingly, with most if not all sealing arrangements there will inevitably be some ingress of contaminants into the housing over the operation life time of the supercapacitor or other charge storage device.

The present embodiment provides a prolonged operational life for supercapacitor 1 as any contaminants that do enter housing 2 will be preferentially rendered inert to the operation of the supercapacitor by the scavenging agent that is grafted to separator 7. The quantity of scavenging agent used in this embodiment sequesters up to about 0.2 cm$^3$ of oxygen. In other embodiments more or less of the scavenging agent is used. For example, in an alternative embodiment utilising a plurality of the capacitive cells, each pouch or pocket of the separator has about 20 mg of the ZERO 2 compound grafted thereto.

As discussed below, the scavenging agent is, in other embodiments, located other than on the separator. However, grafting to the separator has a number of advantages, including the disposition of the scavenging agent for the sequestering of contaminants that are disposed between the electrodes. That is, the ingress of contaminants into housing 2 adversely affects performance if those contaminants enter the electrochemically active region between the electrodes. Activity in this region can physically, chemically or electrically interfere with the charge storage ability of the supercapacitor. Consequently, in this embodiment, any contaminant that is located within the active region is increasingly likely to be sequestered.

As would be appreciated by those skilled in the art from the teaching herein, notwithstanding the use of the invention, manufacturing tolerances and raw material quality variations will continue to ensure a variance of actual life span of supercapacitors and other energy storage devices. The present invention, however, when used with a given manufacturing technique, provides an increase to the mean life span that would otherwise be obtained.

In other embodiments of the invention (not shown) the scavenging compound is grafted or otherwise incorporated into the housing. That is, the housing defines an interior surface and an exterior surface wherein the interior surface provides a site for the scavenging agent.

The use of a scavenging agent within housing 2 allows the level of detrimental contaminants to be reduced. Accordingly, for a given manufacturing process, the failure rate for the supercapacitors is reduced. An alternative is to vary the manufacturing process. That is, the construction of supercapacitors involves progressing the various constituents through a sequence of carefully maintained environments to ensure sufficiently low levels of contamination occur. These environments are expensive to provide and consistently maintain. However, with the use of an internally located scavenging agent some contamination is tolerable without adversely affecting the failure rate of the supercapacitor ultimately produced.

In embodiments where the scavenging agent is not exhausted due to impurities or contaminants introduced in the manufacturing process, it allows a continued removal of undesirable substances from the housing and, in particular, from the electrolyte. Accordingly, the ingress of contaminants into the housing will not, during the useful life of the scavenging agent, compromise the performance of the supercapacitor.

The prior art devices have been concerned with the barrier properties of the walls of the respective housings. However, the present inventor has discovered that the major concern is not the walls themselves but the imperfect seal between a wall and the protruding terminals, or between adjacent walls. To address this issue, the preferred embodiments of the invention have the sequestering agent disposed within the housing rather than within the confines of a wall, as is the case with the device disclosed in U.S. Pat. No. 5,445,856. That is, the preferred embodiments described herein disposed the agent to capture not only specific contaminants that are in transit through a wall, but also those that gain entry to the housing via other paths.

Figure 3:
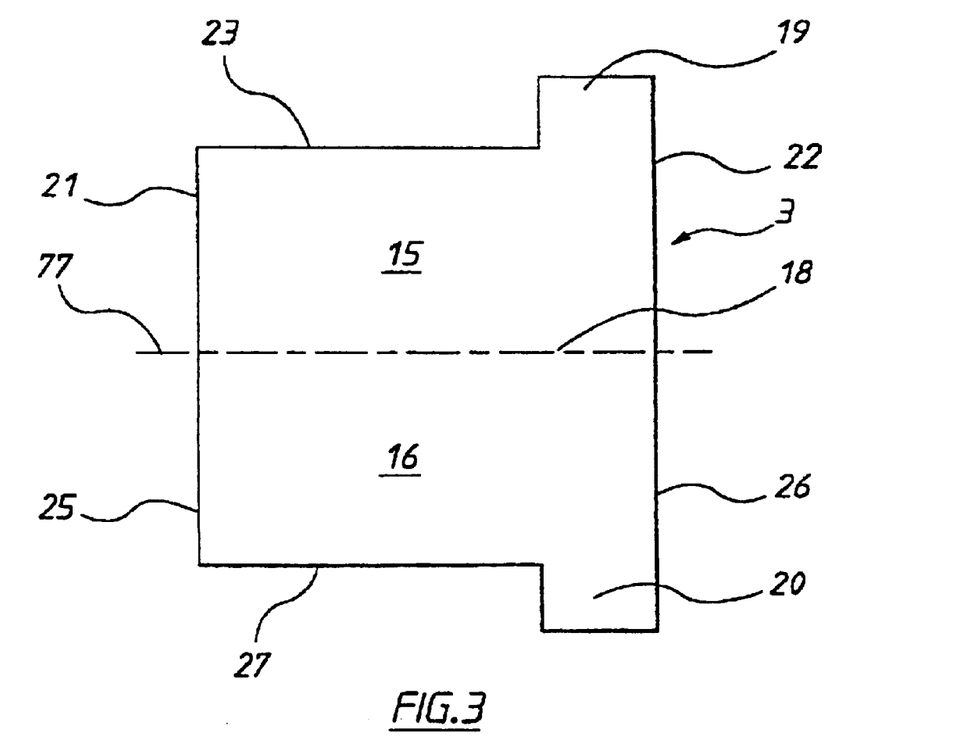
FIG. 3 is a schematic plan view of one of the electrodes of the supercapacitor of FIG. 1.
Figure 4:
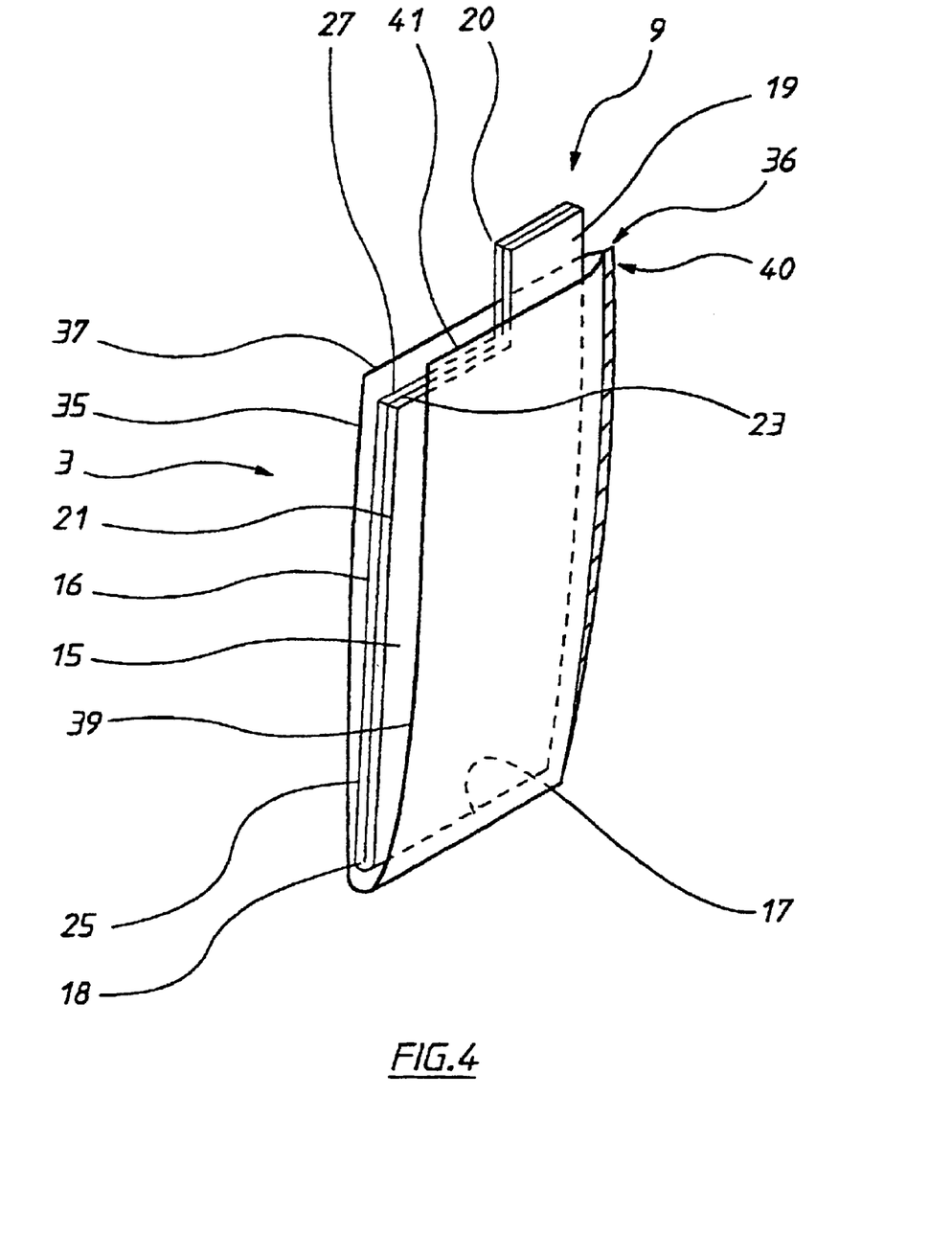
FIG. 4 is a schematic perspective view of an electrode assembly including the separator of FIG. 2 and the electrode of FIG. 3.

Electrode 3 and 4 will now be described in more detail with reference to FIGS. 2 to 4. More particularly, and as best shown in FIG. 3, electrode 3 is substantially rectangular and includes two rectangular sub-sheets 15 and 16. The sub-sheets are integrally formed and symmetrical about a fold line 17 which defines a common edge 18. Sheets 15 and 16 include respective integrally formed rectangular sub-tabs 19 and 20 which, as shown in FIG. 4, abut to collectively define tab 9.

Sheet 15 includes two spaced apart and parallel edges 21 and 22 which extend away normally from edge 18. A further edge 23 extends between edges 21 and 22. As also shown in FIG. 3, tab 19 extends from away from edge 23 adjacent to where that edge meets with edge 22. Similarly, sheet 16 includes two spaced apart and parallel edges 25 and 26 which extend away normally from edge 18. A further edge 27 extends between edges 25 and 26. Similarly also, tab 20 extends from away from edge 27 adjacent to where that edge meets with edge 26.

Electrode 3 is coated on one side only with the activated carbon and then folded about line 17 such that the coated side is outwardly facing, as shown in FIG. 1.

Electrode 4 is the same as electrode 3 only that it is interleaved in the opposite sense so that the respective tabs 9 are spaced apart. This will be described in further detail below. For convenience, corresponding features of the electrodes will be designated with corresponding reference numerals.

Figure 2:
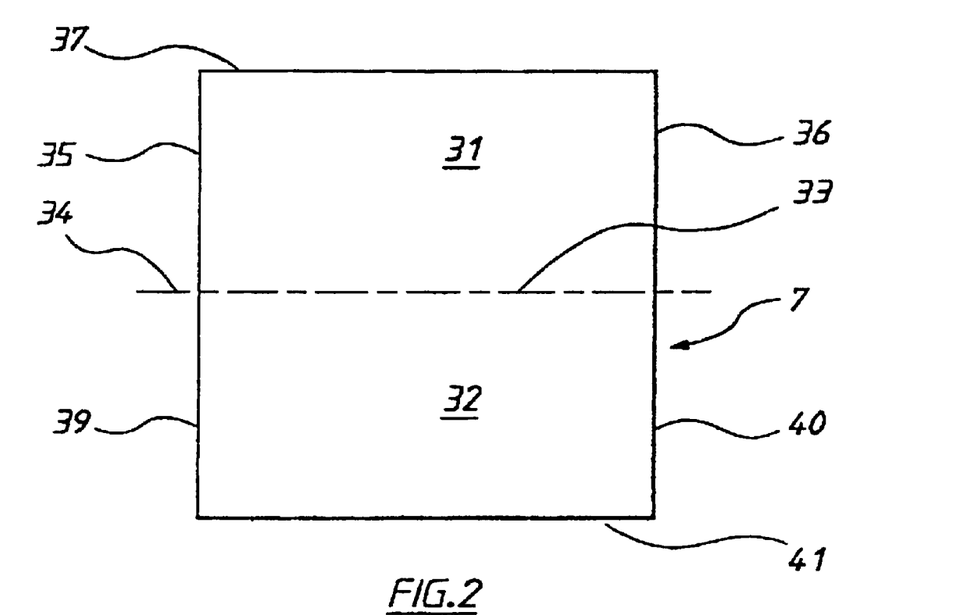
FIG. 2 is a plan view of a separator for the supercapacitor of FIG. 1.

Separator 7 is shown, not to scale, in plan in FIG. 2 and includes two rectangular sub-sheets 31 and 32 which are integrally formed along a common edge 33. This edge also defines a fold line 34. Sheet 31 also includes two spaced apart and parallel edges 35 and 36 which extend away normally from edge 33. A free edge 37 extends between edges 35 and 36. Similarly, sheet 32 includes two spaced apart and parallel edges 39 and 40 which extend away normally from edge 33. A free edge 41 extends between edges 39 and 40.

During manufacture, electrode 3 is folded about line 17 such that the coated sides of sheets 15 and 16 are opposed and outwardly facing. Additionally, tabs 19 and 20 are abutted. Separately, separator 7 is folded about line 34 such that edges 35 and 39 are parallel and abutted together, edges 36 and 40 are parallel abutted together and edges 37 and 41 are parallel and adjacent to one another. Thereafter, edges 35 and 39 are joined together and edges 35 and 39 are joined together. In some embodiments this is achieved with adhesive, while in other embodiments heat welding or other heat treatment is utilised. In still further embodiments the edges are not joined.

As best illustrated in FIG. 4, electrode 3 is then nested within the "pouch" or "pocket" formed by separator 7. As shown, the separator envelopes substantially all of electrode 3 and, as will be described below, maintains electrodes 3 and 4 in a spaced apart configuration. Tab 9 extends outwardly beyond adjacent edges 37 and 41 to allow its electrical connection to terminal 5. For ease of illustration, in FIG. 4 separator 7 is shown with edges 36 and 40 joined by way of heat welding, while edges 35 and 39 are adjacent, although not yet joined.

Figure 5:
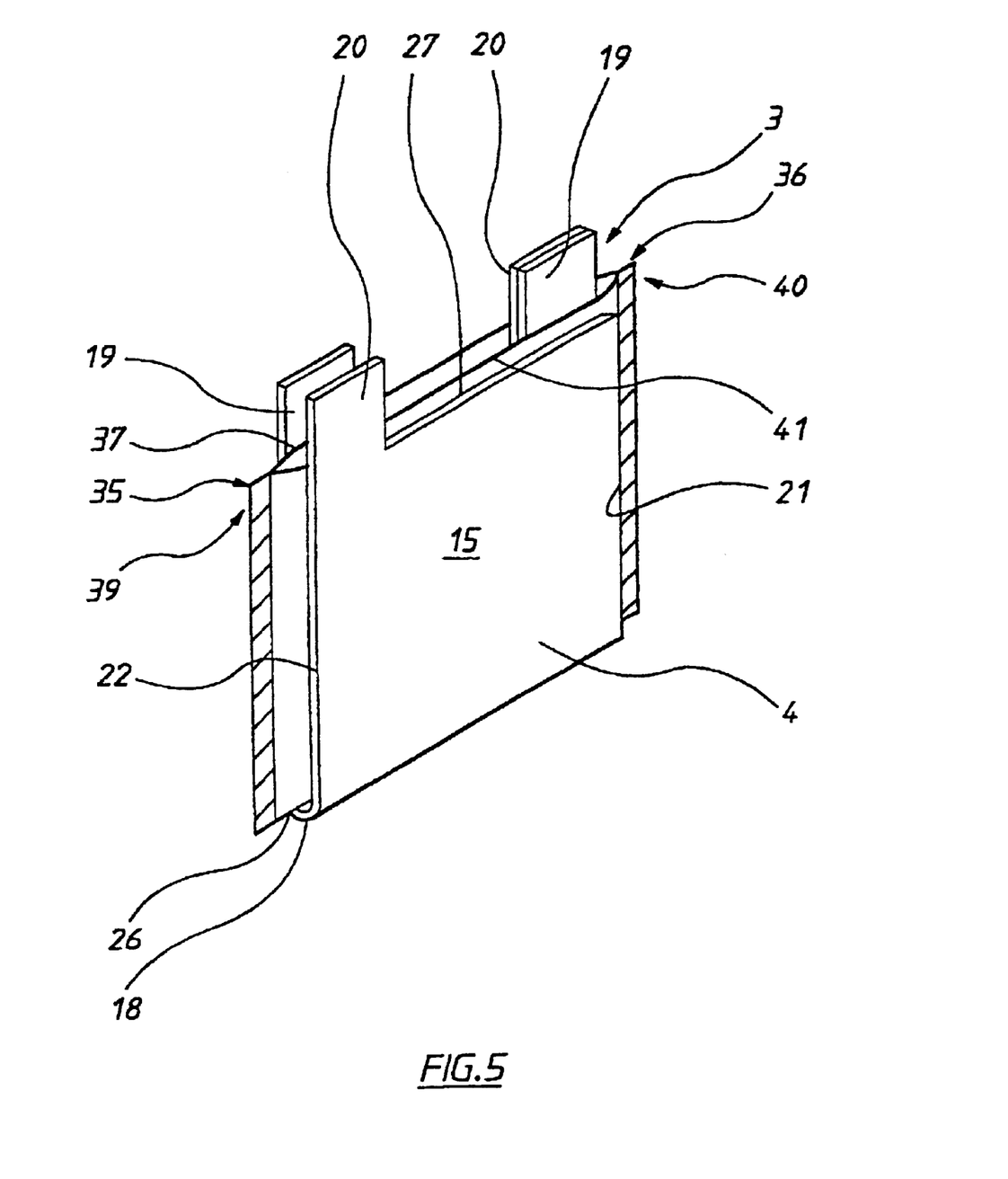
FIG. 5 is a schematic perspective view of the assembly of FIG. 4 nested within a like electrode to that shown in FIG. 3.

Electrode 4 is then formed by folding a like coated sheet to that which forms electrode 3. More particularly, the fold is made along fold line 18 such that that the coated sides of sheets 15 and 16 are opposed and inwardly facing. Additionally, tabs 19 and 20 are adjacent to each other and opposed. The assembly of FIG. 4 is then nested within electrode 4, as best illustrated in FIG. 5, such that the respective tabs 9 of the electrodes are spaced apart. Tabs 19 and 20 of electrode 4 are then abutted and secured to terminal 6 to allow external electrical connection with the electrode.

The electrode assembly of FIG. 5 is referred to as a single cell and, as would be appreciated by a skilled addressee from the teaching herein, a plurality of the cells are able to be connected in parallel to proportionally increase the capacitance of supercapacitor 1. In other embodiments, a plurality of the cells are stacked in parallel such that the respective tabs 9 for like electrodes 3 and 4 form two spaced apart stacks of like tabs. The tabs in each stack are then clamped together and the stacks electrically connected to respective terminals 5 and 6.

Figure 6:
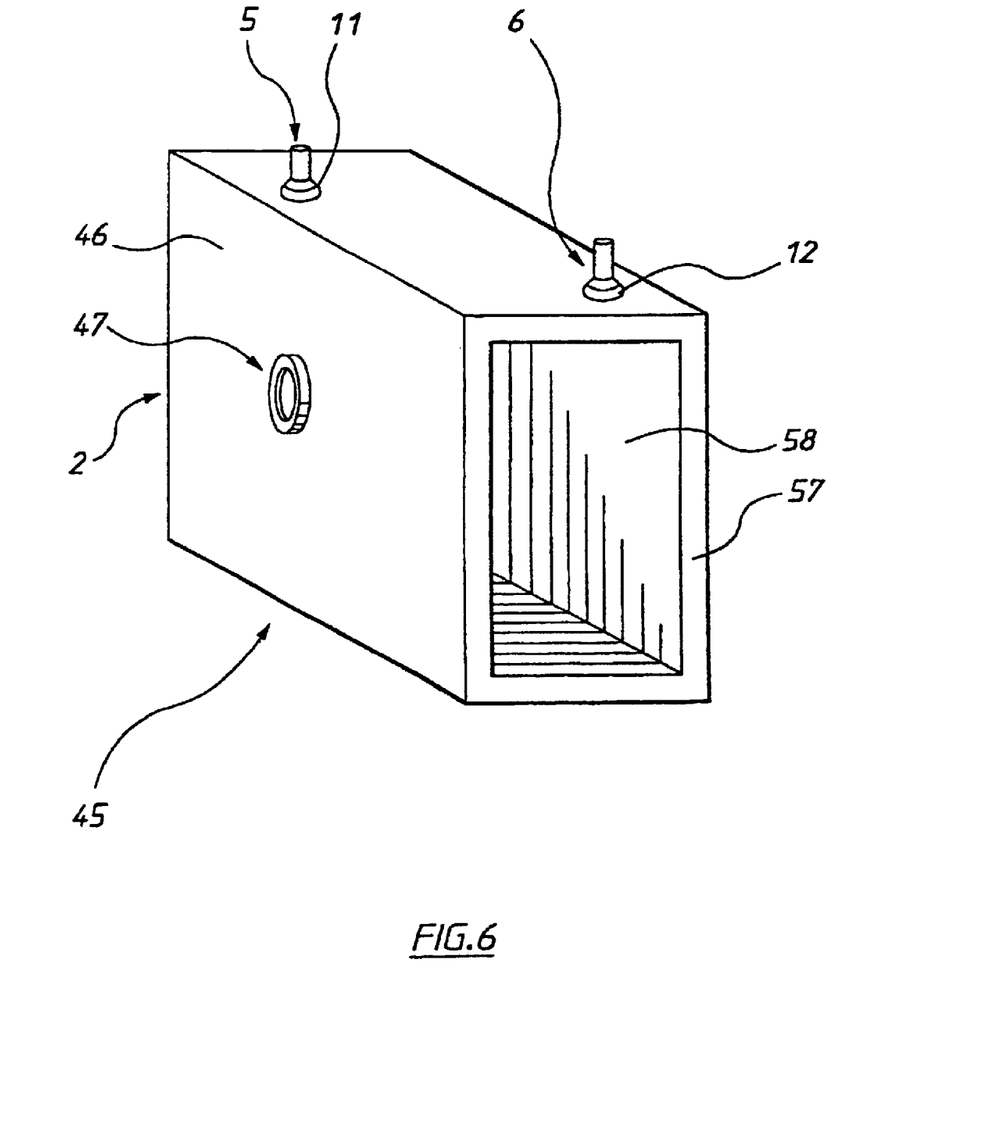
FIG. 6 is a schematic perspective view of an alternative supercapacitor according to the invention.
Figure 7:
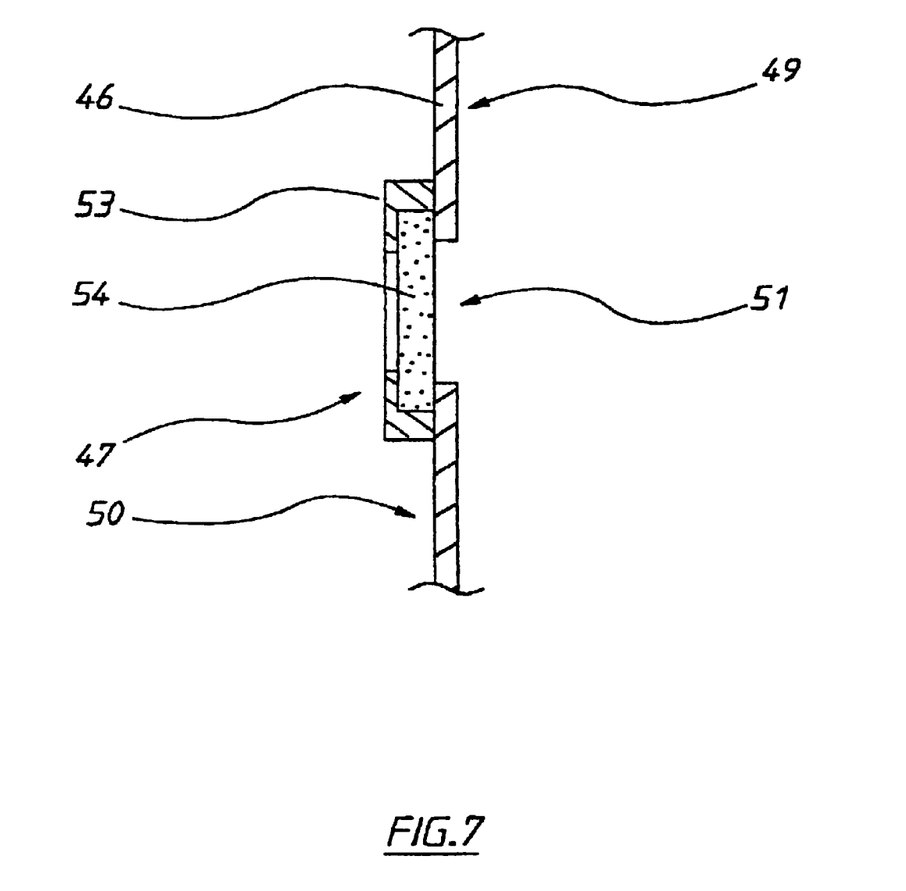
FIG. 7 is a schematic enlarged sectional view of the septum included in the supercapacitor of FIG. 6.

Referring now to FIG. 6 and FIG. 7, where corresponding features are denoted by corresponding reference numerals, there is illustrated a supercapacitor 45. The supercapacitor housing 2 is sealed and one sidewall 46 includes collecting means in the form of a septum 47. As best shown in FIG. 7, wall 46 includes an inner side 49, an outer side 50 and an aperture 51. Septum 47 includes an annular mounting formation 53 which is sealingly engaged with side 50 of wall 46 and which surrounds aperture 51. A circular self-sealing barrier membrane 54 extends across formation 53 and creates a seal between the interior of the housing and atmosphere.

Housing 2 also includes a sidewall 57 having a rectangular window 58 of material which is at least partially transparent to ultraviolet radiation. In other embodiments, window 58 is differently shaped and which extends over a smaller portion of wall 57. In still further embodiments, window 58 is disposed in a sidewall other than that of wall 57. Moreover, other embodiments include window 58 in the base or top of housing 2.

Supercapacitor 45 includes a plurality of the capacitor cells referred to above which are connected in parallel. The like electrodes are electrically connected to respective terminals 5 and 6.

Following the manufacture of supercapacitor 45, a collection device (not shown) in the form of a needle is inserted through membrane 54. The collection device also includes pressure means for creating a negative pressure and a conduit for linking the pressure means to the needle such that gases contained within housing 2 are drawn through the needle and the conduit. That is, the collection device allows the removal of gaseous contaminants from the hosing. The removal occurs immediately following manufacture. In other embodiments, however, the removal is performed at other times and, as such, provides a reconditioning of the supercapacitor. In still further embodiments both the initial removal and reconditioning is performed. For example, in some cases, sensing circuitry is connected in parallel with the supercapacitor to determine when the time constant or other electrical property of the supercapacitor varies by a predetermined percentage from the respective value provided at the time of manufacture. When this variation is detected it provides a warning signal to alert the user that reconditioning is warranted.

Once sufficient gases have been withdrawn the pressure means is deactivated and the needle withdrawn from the septum. The self sealing effect of the septum will prevent the ingress of any gases or moisture into the housing.

The other embodiments, once the pressure means is deactivated, a scavenging agent is released into the conduit and drawn into housing 2 due to the residual negative pressure. This agent progresses into the electrolyte and is available, once activated, for sequestering oxygen and/or other contaminants from housing 2. Activation of the agent occurs by directing ultraviolet radiation through window 58 and into housing 2. Other agents are activated by radiation other than ultraviolet radiation and, in these cases, window 58 is at least partially transparent to the wavelength of the radiation required.

In other embodiments, such as where the scavenging agent is grafted to the separator, supercapacitor 45 operates in the following manner. After all the components are placed within housing 2, and the housing sealed, the agent is activated by directing the appropriate radiation through window 58. After a given operational lifetime, or after testing shows that contaminants have degraded the performance of the supercapacitor, the agent is again activated. However, this subsequent activation will cause the agent to release the sequestered contaminants into housing 2. This being the case, the collection device referred to above is then utilised to apply a negative pressure to the housing such that the contaminants are drawn through the needle and conduit away from the housing. Once the pressure means are deactivated the needle is withdrawn from septum 47 and membrane 54 self seals. Thereafter, the agent will continue to sequester contaminants that subsequently enter housing 2. This process of reconditioning is completed as required.

In other embodiments, septum 47 is replaced with a mechanical one way valve.

Figure 8:
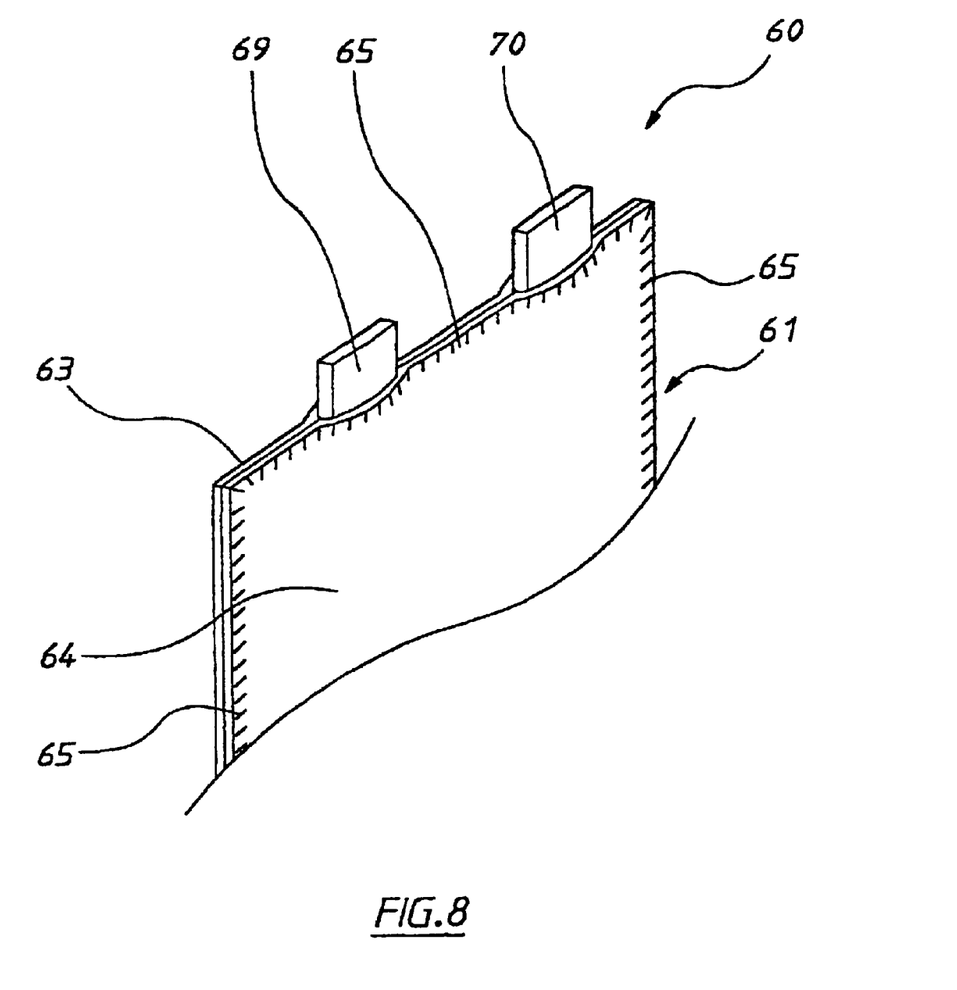
FIG. 8 shows a perspective view of a supercapacitor comprising opposed sheets.

Another embodiment of the invention, in the form of supercapacitor 60, is illustrated in FIG. 8. This supercapacitor includes a housing 61 formed from two like opposed flexible laminate thermoformable sheets 63 and 64. The sheets are generally rectangular and heat sealed about their common periphery 65.

The opposed sheets define an internal cavity in which is disposed the other components (not shown) of supercapacitor 60. As with the other embodiments of the invention, the components that are internal to the cavity are two opposed sheet electrodes, a porous separator disposed intermediate the electrodes, and an electrolyte for allowing ionic conduction between the electrodes.

Supercapacitor 60 also includes two terminals 69 and 70 which are electrically connected to the respective electrodes and which extend from inside the cavity to outside the cavity for allowing electrical connection of the supercapacitor to external circuitry.

Terminals 69 and 70 are aluminium strips that are sealingly engaged, intermediate their respective ends, with the periphery of sheets 63 and 64. This sealing engagement is, however, imperfect due to the very different and incompatible nature of the film and the terminals. This places considerable reliance on the sealant itself to adhere the two materials together.

In this embodiment the sealant is an adhesive sold under the trade name Nucrel. While this provides good adhesive properties it is sensitive the manufacturing process and susceptible to a loss of adhesion during the lifetime of the capacitor. Moreover, while the function of the sealant as an adhesive is adequate, its ability to act as a barrier to ingress of contaminants is less effective. The solution provided by this embodiment is the inclusion within the separator of a collecting agent to sequester any oxygen that penetrates the housing by way of the imperfect sealing of the sealant against either or both of the aluminium terminals or the sheets 63 and 64, or by progress of the contaminants through the sealant itself.

The supercapacitors of the preferred embodiments provide a longer operation lifetime than their predecessors. Alternatively, the operation lifetime is maintained and the cost of manufacturing reduced.

The preferred embodiments also offer a significant range of possible dispositions of the collecting means. Accordingly a wide variety of manufacturing processes can easily accommodate the inclusion of this feature. That is, there is considerable design flexibility in including the collecting means of the invention within a supercapacitor. In most cases this is achieved with minimal departure from existing manufacturing steps.

The preferred embodiments described above have arisen from the understanding that there will always be some contamination of the electrolyte either during the manufacturing process or over time as contaminants penetrate the housing. On this basis, some embodiments have the collecting means disposed within the housing to sequester or otherwise chemically capture the contaminants that are within the housing while, in other embodiments, the collecting means allows removal of the contaminants from within the housing. That is, these embodiments are concerned with addressing the issue of contaminants within the housing, not providing a barrier to those contaminants from getting there in the first place. That barrier function is performed by the housing itself, both in the form of the materials from which it is constructed and the manner in which those materials are combined.

Although the invention has been described with reference to specific examples, it will be appreciated by those skilled in the art that it may be embodied in many other forms and in many other technologies. More particularly, the invention is also applicable to ultracapacitors, batteries such as Li ion batteries, fuel cells, electrochemical catalysts, other ion specific electrodes and the like.

What is claimed is:

1. A charge storage device including:
   a housing;
   at least two opposed electrodes disposed within the housing;
   a separator disposed intermediate the electrodes;
   an electrolyte disposed intermediate the electrodes; and
   a scavenging agent grafted to at least one electrode for sequestering one or more predetermined contaminants from within the housing.

2. A device according to claim 1 wherein the electrodes each include at least one coating and the scavenging agent is one component of at least one of the coatings.

3. A device according to claim 2 wherein the at least one coating includes an activated carbon and the scavenging agent is incorporated into the at least one coating prior to application of the electrodes.

4. A device according to claim 3 wherein the at least one coating includes a binder and the scavenging agent is contained within the binder.

5. A device according to claim 4 wherein the scavenging agent is activated to sequester the one or more contaminants.

6. A device according to claim 5 wherein the scavenging agent is included within the binder prior to that activation.

7. A device according to claim 5 wherein the scavenging agent is activated prior to inclusion of the scavenging agent within the binder.

8. A device according to claim 5 wherein the scavenging agent is activated either prior to or during the assembly of the charge storage device.

9. A device according to claim 5 wherein the scavenging agent is activated by exposure to predetermined wavelengths and intensities of electromagnetic radiation.

10. A device according to claim 1 wherein the scavenging agent sequesters oxygen from the housing.

11. A device according to claim 1 wherein the scavenging agent sequesters water from the electrolyte.

12. A device according to claim 1 wherein the scavenging agent sequesters bromine or chlorine from the housing.

13. A device according to claim 1 wherein the sequestering results in the contaminants being isolated from the charge storage operation of the device.

14. A device according to claim 1 wherein the sequestering results in a chemical change of the contaminants.

15. A charge storage device including:
   a housing;
   at least two opposed electrodes disposed within the housing;
   a separator disposed intermediate the electrodes;
   an electrolyte disposed intermediate the electrodes; and
   a scavenging agent grafted to the separator for sequestering one or more predetermined contaminants from within the housing.

16. A device according to claim 15 wherein the scavenging agent is activated to sequester the one or more contaminants.

17. A device according to claim 16 wherein the scavenging agent is activated prior to being grafted to the separator.

18. A device according to claim 16 wherein the scavenign agent is activated either prior to or during the assembly of the charge storage device.

19. A device according to claim 16 wherein the scavenging agent is activated by exposure to predetermined wavelengths and intensities of electromagnetic radiation.

20. A device according to claim 15 wherein the scavenging agent sequesters oxygen from the housing.

21. A device according to claim 15 wherein the scavenging agent sequesters water from the electrolyte.

22. A device according to claim 15 wherein the scavenging agent sequesters bromine or chlorine from the housing.

23. A device according to claim 15 wherein the sequestering results in the contaminants being isolated from the charge storage operation of the device.

24. A device according to claim 15 wherein the sequestering results in a chemical change of the contaminants.

25. A method for constructing a charge storage device having a housing and at least two opposed electrodes disposed within the housing, the method including the step of grafting a scavenging agent to at least one electrode for sequestering one or more predetermined contaminants from the housing.

26. A charge storage device including:
   a housing;
   at least two opposed electrodes disposed within the housing;
   a separator disposed intermediate the electrodes;
   an electrolyte disposed intermediate the electrodes; and
   a scavenging agent grafted within the housing for sequestering one or more predetermined contaminants from within the housing.

27. A method for constructing a charge storage device having:
   a housing;
   at least two opposed electrodes disposed within the housing; and
   a separator disposed intermediate the electrodes;
   the method including the step of grafting a scavenging agent to the separator for sequestering one or more predetermined contaminants from within the housing.

* * * * *